E. FUCHS.
ENDLESS TRACK VEHICLE.
APPLICATION FILED JUNE 28, 1919.
1,315,297.
Patented Sept. 9, 1919.
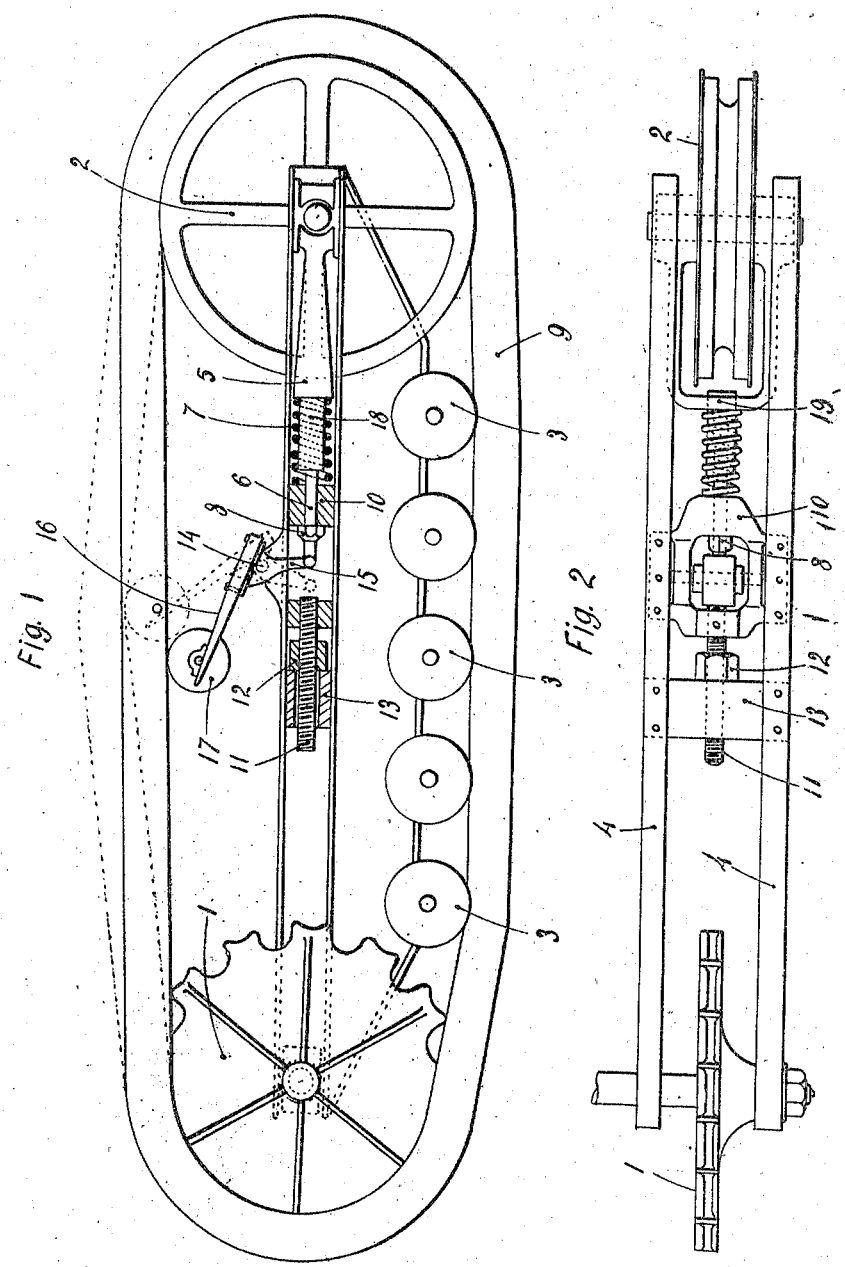
Inventor.
Ernest Fuchs,
by Chas J. O'Neill
Atty.

UNITED STATES PATENT OFFICE.

ERNEST FUCHS, OF PARIS, FRANCE, ASSIGNOR TO LOUIS RENAULT, OF BILLANCOURT, FRANCE.

ENDLESS-TRACK VEHICLE.

1,315,297.   Specification of Letters Patent.   Patented Sept. 9, 1919.

Application filed June 28, 1919. Serial No. 307,387.

*To all whom it may concern:*

Be it known that I, ERNEST FUCHS, a citizen of the French Republic, residing at Paris, Department of the Seine, in France, and whose post-office address is 111 Boulevard Exelmans, in the said city, have invented certain new and useful Improvements in or Relating to Endless-Track Vehicles; and I do hereby declare the following to be a full, clear, and exact description of the invention, such as will enable others skilled in the art to which it appertains to make and use the same.

The invention relates to an arrangement in endless track vehicles for maintaining automatically the tension on the track, which forms an endless band or chain, when the movement of the vehicle changes from a forward movement to a backward movement.

If the propulsive action of an endless track vehicle be examined the following facts can be easily confirmed by reference to the accompanying drawing.

Figure 1 is an elevation shown diagrammatically and Fig. 2 a plan of the transmission mechanism of an endless track.

During the forward movement the chain does not require tensioning. In Fig. 1 the rear of the mechanism is indicated at 1 and the front at 2. The track is moved by the toothed wheel 1 on which the track coils or is wound from behind and passes to the front over the wheel 2, the track bearing on the ground and working forward it is not necessary that the upper stretch of the chain be under tension as above stated.

In normal forward motion, the reaction on the axle of the wheel 2 is very slight (it is produced simply by the friction of the wheel 2 on its axle and the resistance due to uncoiling or unwinding of the upper stretch or length of the chain). On the contrary when the vehicle is moving backward, the upper stretch or length of the chain drawn by the toothed wheel 1 tightens under the tractive effort of the toothed wheel.

If the chain is slackened the tension on the upper length thereof produces slackening of the lower length which frequently causes derailment.

The object of the present invention is to effect automatically tensioning of the upper length of the chain in the backward movement and slackening thereof during the forward movement, thereby correcting a grave defect.

An arrangement for carrying out the present invention is shown in Figs. 1 and 2 of the accompanying drawing.

The track comprises the chain 9 actuated by the toothed wheel 1 and supporting the friction rollers 3. Two beams 4 are articulated in the axle of the wheel 1 and the axle of the wheel 2 is supported by a fork 5, which ends in a rod 6 provided with a nut 8. The rod 6 passes through a crosshead 10 and supports a pin 14 on which is pivotally mounted a lever 15 rigid with a spring 16 provided at its end with a roller 17. The crosshead 10 carries at the rear end a screw 11 which is non-rotatably fixed in the crosshead 10. The screw 11 is provided with a nut 12 which bears on a cross piece 13 fixed to the beams 4. Between the fork 5 and the crosshead 10 is arranged a spring 7.

The action of the arrangement is as follows:

On the forward movement the reaction on the fork 5 is slight and less in value than the force necessary to compress the spring 7. The upper stretch or length of chain is therefore sufficiently slack. When an abnormal resistance is produced in the lapped portion of the chain, for example by the introduction into the track of a foreign body, the reaction on the axle of the wheel 2 becomes sufficient to compress the spring 7 and the fork 5 then recoils a certain length and rupture of the chain or any of the mechanical parts is thus avoided.

On the reverse or backward movement, the upper length or stretch of the chain is tensioned by the wheel 1 and the reaction which is produced on the axle of the wheel 2 is practically equal in value to double the tractive effort exerted on the upper length or stretch of the chain. This reaction is just sufficient to compress the spring 7 so that the end of the rod 6 acts on the head of the lever 15 which forces the spring 16 and the roller 17 upward so as to tension or tighten the upper length or stretch of the chain.

The stop nut 8 is intended to limit the forward displacement of the fork 5. The screw 11 and the nut 12 supported on the cross piece 13 allow of the forward displacement of the fork 5 of the crosshead 10 when the chain becomes extended or slack due to wear or use. The rod 6 is provided at or near its front end with an enlarged part 18 which bears on the crosshead 10 and limits the displacement of the fork 5 relatively to the head 10. The fork 5 is itself secured to the rod 6 by a pin 19 which should break when the safe load on the chain accidentally becomes excessive.

In Fig. 1, the solid lines indicate the position of the chain during forward movement and the dotted lines the position of the chain as well as the tensioning means during backward or reverse movement.

I claim:

An automatic tensioning arrangement for endless track vehicles operating only during backward or reverse movement and characterized by the action of a roller which tensions the upper length or stretch of chain, the said roller being mounted on the end of an oscillating lever in the form of a spring, the other end of the lever being actuated by the front wheel when the reaction thereon exceeds a predetermined limit and controlled by a suitable spring.

In testimony whereof I affix my signature, in presence of two witnesses.

ERNEST FUCHS.

Witnesses:
   CHAS. P. PRESSLY,
   EMILE KLOP.